F. W. DONISTHORPE.
COLOR PHOTOGRAPHY AND CINEMATOGRAPHY.
APPLICATION FILED MAR. 26, 1914.
1,193,879.  Patented Aug. 8, 1916.
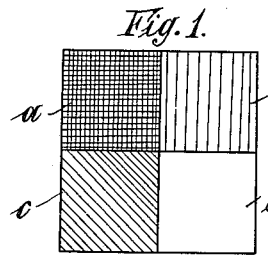
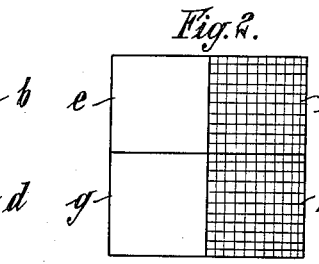
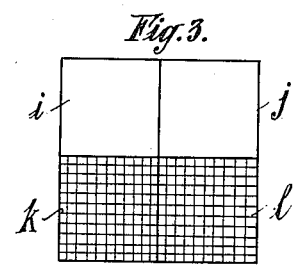
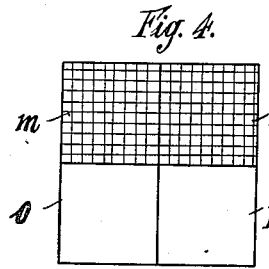
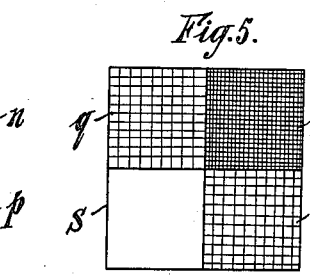
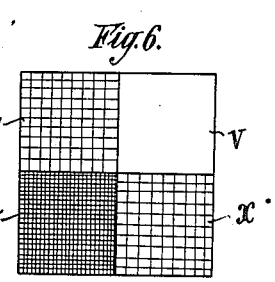
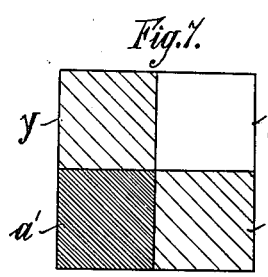
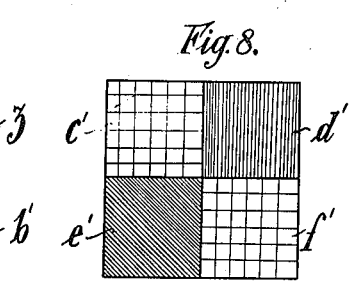
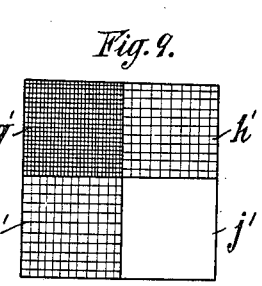
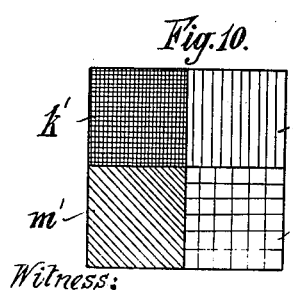
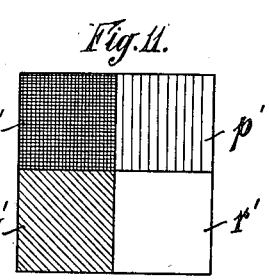
Witness;
E. D Bartlett
Inventor
Frank Wordsworth Donisthorpe
per
Knight Bros
Attorneys.

UNITED STATES PATENT OFFICE.

FRANK WORDSWORTH DONISTHORPE, OF BARNES, ENGLAND.

COLOR PHOTOGRAPHY AND CINEMATOGRAPHY.

1,193,879.  Specification of Letters Patent.  Patented Aug. 8, 1916.

Application filed March 26, 1914. Serial No. 827,484.

*To all whom it may concern:*

Be it known that I, FRANK WORDSWORTH DONISTHORPE, subject of the King of England, residing at 5 Clavering avenue, Barnes, Surrey, England, have invented new and useful Improvements in and Relating to Color Photography and Cinematography, of which the following is a specification.

This invention is based on the fact that if a negative which has been exposed through a light filter of one color, red for example, is placed in contact and the image superimposed with a print from a negative taken through another color, green for example, the two pictures exactly counteract each other in all parts which contain no color, such as blacks, whites, grays and all shading—that which is black in the negative would be white in the positive and vice versa, thus viewing through the two images superimposed would give no image at all. Where one color in the object photographed in any way predominates a different effect is obtained; those parts on the red filtered negative are not counterbalanced by the positive from the green filtered negative. For instance, pure green objects would be approximately white on the red filtered negative and also approximately white on the green filtered positive and the pure red objects would be black on both, and other colored objects tending more to green or more to red would come out more or less black on one or other of the photographs. The result is that a print taken through the combined negative and positive, and developed and fixed in the usual manner, will have the coloring matter only in black and white, everything else having been neutralized by the two images cutting each other out. The print may be made through the negative and positive superimposed as just mentioned or through each in turn separately occupying the same position; for the time being it is assumed that the former course is adopted.

The prints taken through the superimposed negative and positive will give the red parts of the subject photographed as pure white, the green as pure black and the between colors as lighter or darker grays. Now if this print be taken and placed in a bath which will tone the silver image green and at the same time render such image impermeable to liquid dyes, and said print then be placed in a red dye bath, the blacks of the picture will be toned green and the whites dyed red, while the grays will be colored with a little of green and a little of red. The darker and lighter shades in the toned print take less or more red dye according to the color of the photographed objects so that more greenish or reddish shades result. This turns the print back into the colors which were originally filtered through the two light filters, or in other words it results in a representation of the colors passing through the filters only. Now if such prints are placed in contact with black and white positives made from negatives filtered through both red and green light filters, the whole picture will be rendered in natural colors or substantially so—the green and red print giving the coloring matter and the other the blacks, whites and shadings. To make a single film of the whole the colored print obtained as above described may be recoated with sensitive emulsion and the black and white picture printed onto it, by the usual photographic means, or instead of recoating, the film may be kept sensitive by carrying out all operations of its manufacture in the dark room and not fixing it, and then printing the black and white picture upon it just as though it had been recoated.

The invention is more clearly explained with reference to the annexed drawings which show diagrammatically one method of carrying the present invention into practice.

In these drawings: Figure 1 is a diagrammatic representation of a subject which it is desired to photograph in color; Fig. 2 is a like representation of a negative taken through a color filter; Fig. 3 represents a negative taken through a filter of a complementary color to that employed in connection with Fig. 2; Fig. 4 is a positive printed from the negative of Fig. 3; Fig. 5 is the result obtained by combining or superposing the positive shown in Fig. 4 with the negative shown in Fig. 2; Fig. 6 is a print from the combination negative of Fig. 5; Fig. 7 shows Fig. 6 after receiving the toning treatment hereinafter more particularly referred to; Fig. 8 shows the print of Fig. 7 after undergoing the dyeing treatment more especially described below; Fig. 9 shows diagrammatically a print in black and white taken from a combination negative made by superimposing the negative shown in Fig. 2 and that shown in Fig. 3; Fig. 10 represents the finished picture made by superimposing the print toned and dyed as shown in Fig. 8 and the black and white print shown in Fig. 9; and Fig. 11 shows Fig. 10 seen by strong transmitted light.

The subject illustrated in Fig. 1 is supposed to be a color chart. It is more convenient to take a chart as shown divided into four sections of different colors rather than a spectrum chart. This will be appreciated after considering the following description. The square $a$ is black, the square $b$ is red, the square $c$ is green, and the square $d$ is white. Fig. 2, in the particular instance taken, is considered a negative taken through a red filter. The black square $a$ will obviously appear in this negative as a white square $e$. The red square $b$ will appear as a dark gray square $f$, and similarly the green square $c$ through a red filter will appear white as shown at $g$, and the white square $d$ will come out dark gray as shown at $h$.

Different effects are seen in Fig. 3 which are assumed to be taken through a green filter complementary in color to the filter used in obtaining the negative shown in Fig. 2, while the black square $a$ will come out white in the negative at $i$ as before, the red square $b$ instead of being dark gray will now be white as seen at $j$, and the green square $c$ will come out as a dark gray square $k$, as will the white square $d$ come out as a dark gray square $l$. The positive made from the negative of Fig. 3 shown in Fig. 4 is easy to follow. The white squares $i$ and $j$ will print out as the dark gray squares $m$ and $n$ respectively, while the dark gray squares $k$ and $l$ will print out as white squares $o$ and $p$ respectively.

It will be remembered that shortly put, Fig. 5 is a combination of Fig. 2 and Fig. 4. By simple addition, so to speak, we get square $q$ is dark gray, square $r$ consists of the addition of two gray squares and therefore is black, square $s$ is white, square $t$ is dark gray. Thus Fig. 5 serves as the final combination negative for obtaining that part of the final picture which gives the color effect. Hence Fig. 6 is simply printed from Fig. 5 and is a positive regarding Fig. 5 as a negative. In Fig. 6 then square $u$ is dark gray, square $v$ becomes white, $w$ black and $x$ dark gray. In Fig. 7 this print has received the green toning treatment. The square $u$ has there become light green as seen at $y$; $v$ remains white as seen at $z$, $w$ is of an intense green color as shown at $a'$, and square $x$ is of a light green as shown at $b'$. It will be remembered that the green toning, in addition to its actual toning effect, has rendered the image toned impermeable to liquid dyes. Hence in the next stage these parts of the image are not affected by the red dye, and the result of the dyeing treatment shown in Fig. 8 is as follows: Square $a'$ is not affected and remains intense green as seen at $e$. The square $z$ is intensely dyed by the red dye and becomes an intense red color. The remaining two squares $y$ and $b'$ although partly toned green have not had all their susceptibility to dye taken away from them. Hence they will be dyed lightly. Both of them will be of a gray color formed of a combination of light green and light red. This is secured at the squares $c'$ and $f'$.

As far as color value goes, the result in Fig. 8 is true, but it is not true as far as black and white effect is concerned, that is to say it has no relief or shading. To add this effect to the color effect already attained, the print shown in Fig. 9 is made and the negative employed consists of the negative shown in Figs. 2 and 3 superimposed. Consider first of all the square $g'$, the negative square through which it is taken consists of a white square in both negatives, that is to say, the squares $e$ and $i$. Obviously the square $g'$ prints out black. The square $h'$ is printed through a negative consisting of a dark gray and a white square, viz. $f$ and $j$. It therefore prints out dark gray. Similarly the square $i'$ printed through the squares $g$ and $k$ is also dark gray, while on the other hand the square $j'$ printed through the dark gray squares $h$ and $l$ gives as a result a white square.

The finished picture in Fig. 10 is made by combining Figs. 8 and 9. The result is that square $k'$ formed by adding $c'$ to $g'$, a gray to a black, gives a black picture. The square $l'$ by adding dark gray to intense red comes out as red; the square $m'$ by adding intense green to dark gray comes out green, while the square $n'$ formed by adding gray to white gives a gray picture. In strong transmitted light the picture appears as in Fig. 11, viz. the square $o'$ is black, the square $p'$ red, the square $q'$ green, and the square $r'$ appears white. Hence when projected upon a screen the picture of Fig. 10 appears like the original subject shown in Fig. 1.

There are various solutions for toning the silver image of the print taken from the superimposed positive and negative, and at the same time rendering it impermeable to liquid dyes, by depositing a pigment into the silver of the image, which fills up the gelatin so that no dye can penetrate the densest parts.

The following are some examples:

1. (a) Vanadium chlorid _____ 5 gms.
   Ferric chlorid _____ 25 "
   Ferric oxalate _____ 2 "
   Oxalic acid solution ____ 1000 c.c.s.
   (b) Potassium ferricyanid____ 5 gms.
   Water _____ 1000 c.c.s.

For use mix equal portions of each. This bath tones the image green, and the print should, therefore, then be dyed red.

2. (a) Vanadium chlorid _____ 5 gms.
   Oxalic acid solution ____ 1000 c.c.s.
   (b) Potassium ferricyanid____ 5 gms.
   Water _____ 1000 c.c.s.

For use mix equal portions of each. This bath gives a bright yellow image and the print should be dyed blue-violet to violet.

The oxalic acid solution referred to in the above two examples is of a strength of 100 grams of acid per liter of water.

Combinations of iron and vanadium can be mixed in any number of ways to produce different tones of green, and the prints then dyed in various red dyes more or less complementary to the greens obtained.

3. (a) Uranium nitrate _____ 25 gms.
   Water _____ 500 c.c.s.
   (b) Potassium ferricyanid____ 25 gms.
   Water _____ 500 c.c.s.

For use mix equal portions of each and add a small quantity of acetic acid. The image is now reddish yellow and the print should, therefore, be dyed blue to green.

In all the above baths 20 minutes is a sufficient time to immerse the prints for use. The above baths should be followed by a bath of "hypo" i. e. sodium thio-sulfate which removes the silver image and gives brighter tones.

The above formulas are given by way of example only and are not intended to in any way indicate a limitation of the scope of the present invention.

Combinations of more than two colors can be obtained according to another method by simply repeating the process above mentioned, but utilizing other combinations of colors, such as yellow and violet, and placing the first complete color picture in superimposition with the second complete color picture and with a black and white picture, or combining the three by recoating with sensitive emulsion for the second set of colors and for the black and white.

Another method for a more than two color combination would be to bring three or more negatives taken through different colored light filters into contact with the same number of positives from negatives taken through other light filters and printing from each combined pair in a separate color, say red from one pair, blue from another, and yellow from another pair. When the desired number of negatives and positives combined have been printed, the colored results from them are all superimposed together and placed over a correctly filtered black and white picture, namely from a negative made on a panchromatic plate taken through the desired filter or filters, and result in a color picture.

Another method is to place a single positive from an ortho-chromatic negative (i. e. a negative taken on a panchromatic plate through a screen which renders all colors equally) in turn with three negatives which have been taken through filters dividing the spectrum into three parts as in the present known methods of three-color photography, and making prints from these combined plates or films in three suitable colors and combining the lot with a black and white print from an ortho-chromatic filtered negative all correctly superimposed. The result is a natural color picture; the difference between this and the present three-color methods being that the coloring matter is put on the black and white print alone instead of the blacks, whites and grays being made by a combination of three colors.

The first mentioned two-color method I intend to use chiefly for cinematography as being an exceedingly quick and easy method of producing color pictures which contain all colors capable of being produced by a combination of two colors as a result of the division of the spectrum into two parts only.

If a true natural color photograph is not required a pretty effect could be obtained by placing the dye on with a brush instead of placing the whole picture into a dye bath. By this means various colors could be put on locally; the toned and hardened portions preventing the coloring matter from smudging by its refusing to take the dye, thus making it easy to color correctly and quickly.

Having now particularly described and ascertained the nature of my invention, and in what manner the same is to be performed, I declare that what I claim is:—

1. A process for the production of photographs and cinematographs in natural colors consisting in making negatives through color filters of different colors, making a positive from one of said negatives, superimposing said positive on the other negative to produce a combination negative, making a print from said combination negative, suitably coloring the portions of said print affected and unaffected by the action of light respectively and finally superimposing upon said print a print in black and white to produce contrasts and to give the finished picture.

2. The process for the production of photographs and cinematographs in natural colors, consisting in making negatives through complementary color filters, making a transparency from one of said negatives, superimposing said transparency with the other negative so that the two completely neutralize one another on all parts except where the subject is colored, making a print from said combined negative, suitably coloring the portions of said print affected and unaffected by the action of light respectively, and finally superimposing a positive in black and white upon said colored print to produce contrasts.

3. A process for the production of photographs and cinematographs in natural colors consisting in making a pair of negatives taken through complementary color filters, making a positive print from one of said negatives, producing a combination negative by superimposing said positive upon the other negative, obtaining a print from said combination negative, toning the silver image, on said print, by a reagent, rendering it impermeable to liquid dyes and dyeing the parts unaffected or only partly affected by the toning reagent by means of a dye of suitable color, and finally superimposing upon said printing color a black and white print of the subject to produce contrasts in the finished picture.

4. Process for the production of photographs and cinematographs in natural colors consisting in making a pair of negatives taken through complementary color filters, producing a positive from one of said negatives, making a combination negative by combining said positive with the other negative, making a print from said combination negative, toning said print with a suitable reagent so that a pigment of any desired color is deposited into the silver of the image so that while coloring the silver image it fills up the pores of the gelatin and so prevents liquid dyes from permeating said gelatin, dyeing said print by means of a liquid dye of suitable color, and finally combining said print with a black and white print to give contrasts to the final picture.

In testimony whereof I have signed my name to this specification in the presence of two subscribing witnesses.

FRANK WORDSWORTH DONISTHORPE.

Witnesses:
CUETTE SMITH,
FREDERICK JAMES BINGHAM.